Aug. 28, 1928.

W. M. HOFFMAN 1,682,126

FARE REGISTER

Filed Jan. 31, 1919

INVENTOR
William M. Hoffman
BY
Chas. W. Mortimer
ATTORNEY

Aug. 28, 1928.
W. M. HOFFMAN
FARE REGISTER
Filed Jan. 31, 1919
1,682,126
2 Sheets-Sheet 2
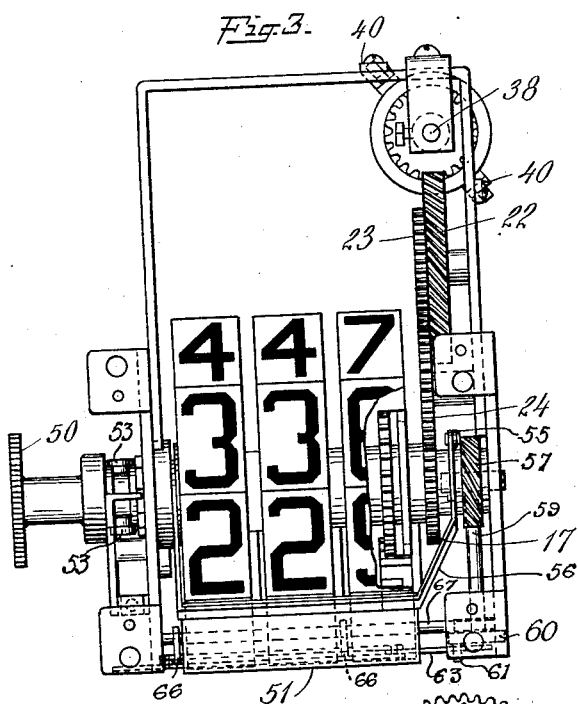
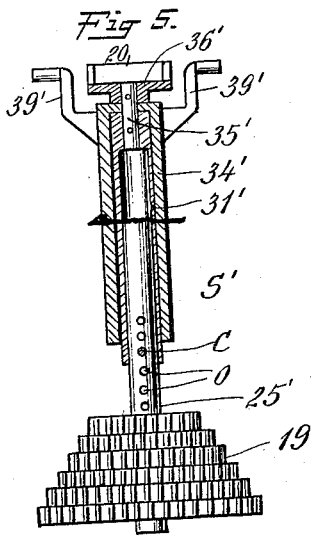
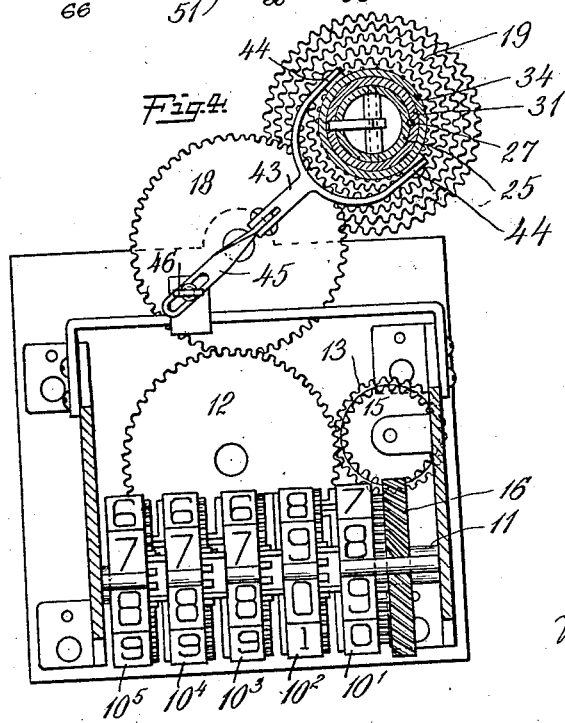
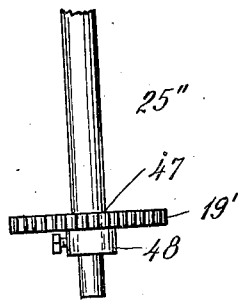
INVENTOR
William M. Hoffman
BY
Chas. W. Mortimer
ATTORNEY Patented Aug. 28, 1928.

1,682,126

UNITED STATES PATENT OFFICE.

WILLIAM M. HOFFMAN, OF ROXBURY, MASSACHUSETTS.

FARE REGISTER.

Application filed January 31, 1919. Serial No. 274,164.

This invention relates to an improvement in fare registers. It relates more particularly to the type of fare registers used on street cars in which a common driving element is caused to actuate indicators so that there is a simultaneous registering of the unit fares or number of fares or passengers on one indicator and a registering of the total amount of the fares on a different indicator, usually called the totalizer. A fare register of this type is illustrated in the patent to Woodward 1,344,840 of June 29, 1920.

In registers of this character there are trains of gears which bear a predetermined, definite relation to each other so that for each step of the unit fare indicator there is an invariable amount of actuation of the total fare indicator which amount is determined by the gear ratios. This ratio may be dependent upon the rate of fare so that for a single trip of a car the totalizer will be stepped up an amount corresponding with the number of units indicated on the unit indicator multiplied by the rate of fare. Such registers are not suitable for use when the rate of fare changes because of lack of co-ordination between the total amount collected and the number of fares recorded at the new rate. It is usual in making registers of this sort to provide means operable from outside the cover for resetting the unit or trip register to zero, while the totalizer is inaccessible to unauthorized persons for resetting purposes, but can be set by those having access to the inside of the cover. The conductor returns the trip register to zero at the end of each trip, but is unable to change the reading of the totalizer. In this way a record is kept by the totalizer of the total fares collected since the totalizer was last set, while an inspector is enabled to check the fares collected on an individual trip when he boards the car.

In order to adapt these registers to the new condition of changed rate of fare, it has been necessary to dismantle the same and insert gears with a different ratio in order to obtain consonance between the indicators, thus resulting in great expense and loss of time which must be repeated if the fare is again changed.

The object of my invention is to obviate the difficulties above alluded to, and to produce a fare register in which the change over from one rate of fare to any one of many other rates can be quickly and conveniently effected.

My invention can be attached to existing fare registers so that the desired result can be obtained, or fare registers can be built embodying my invention so that such registers are readily adapted to the uses mentioned. The invention consists in providing a connection between the main drive of the fare register and one of the indicators, which connection can be adjusted so as to vary the relative amounts of actuation of the unit indicator and the totalizer in accordance with the specified rate of fare under which the cars are operated. The proper corelation between the unit fare indicator and the totalizer can thus be always maintained.

The invention will be understood from the drawings and the accompanying description in which like numerals refer to the same part. In the drawings, Fig. 1 is a front elevation of the register.

Fig. 3 is a plan view of the register.

Fig. 4 is a sectional view taken along the line 4—4 of Fig. 2.

Fig. 5 is a view, partly in section, showing a modification of the change speed mechanism.

Fig. 6 shows another modification.

Figure 2:
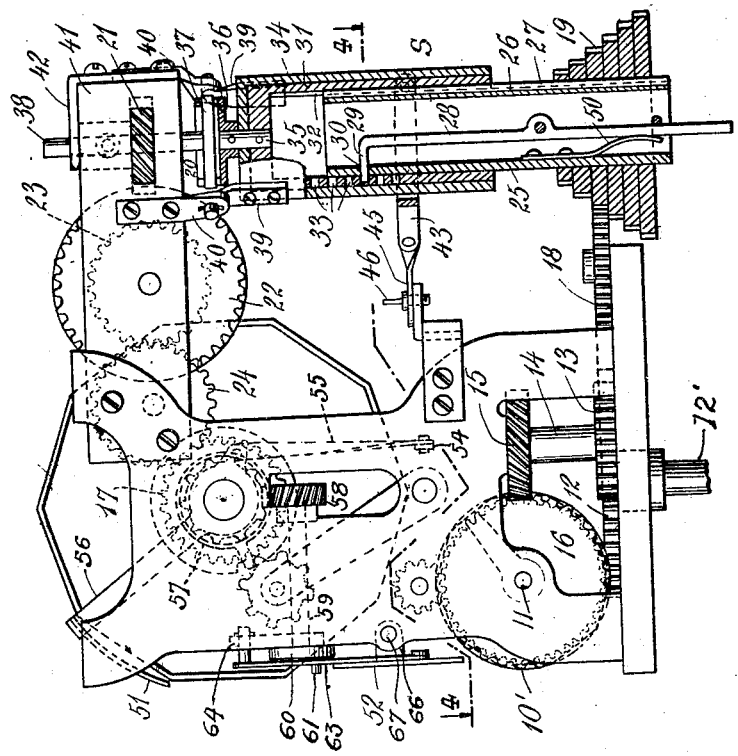
Fig. 2 is a side elevation of the same, partly in section.
Figure 1:
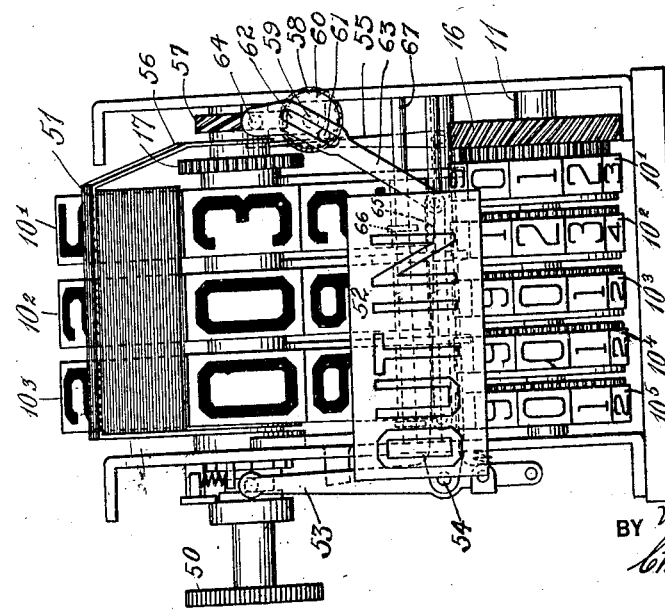

Reference characters $10^1$, $10^2$, $10^3$, $10^4$ and $10^5$ designate a series of wheels loosely mounted upon a common axis 11. Upon the face of each of these wheels is a series of numerals, 0 to 9 inclusive, and the wheels are connected in the well-known way so that just as wheel $10^1$ completes one revolution wheel $10^2$ is turned the distance between two successive numerals, and so on through the entire series. when the cover (not shown), is placed on the register, only one numeral on each wheel is visible to an observer through a slot or opening in the face of the cover. This set of wheels is inaccessible to the conductor so that only a duly authorized person can set the same to zero in the usual way.

12 is the main drive wheel for the register. This drive wheel 12 is to be turned a predetermined amount in accordance with the amount of fare collected. This is done in any convenient way such as by the actuation of a lever or by connecting the gear 12 to a money counting machine by means of shaft $12^1$ which automatically actuates it in accordance with the amount collected. By means of the gear wheel 13, shaft 14 and gear 15 the gear 16 is driven, which actuates the wheels $10^1$, $10^2$, etc. to indicate the amount of fare collected.

Reference characters $10_1$, $10_2$, and $10_3$ designate a series of indicator wheels which have numerals 0 to 9 on the periphery of the same to indicate the number of fares collected. These wheels are operated in the well known way from gear wheel 17 which is driven from the main drive wheel 12 through gears 18, 19, transmission mechanism S (which will be described in detail below), universal joint 20, gear 21 and gears 22, 23 and 24.

The transmission mechanism designated as a whole by the reference character S, consists of the following elements: 25 is a hollow shaft to the lower end of which a stepped gear 19 consisting of a series of gear wheels of different sizes is rigidly connected. The shaft 25 has a longitudinal key way 26 along the outside thereof in which the key 27 fits, or a longitudinal rib on the outside of the shaft 25 may be employed instead of the key 27. Inside the shaft 25 is pivoted a lever 28, having a bent end 29 which extends through a hole 30 in shaft 25. This lever 28 is actuated by spring 50 so that the end 29 will project through the hole 30. The shaft 25 fits closely into cylinder 31 and is prevented from revolving with respect thereto by the rib or key 27 sliding in the slot 32 in the cylinder 31. A series of holes 33 are so disposed in cylinder 31 that the end 29 of the lever 28 projects into one of the same when the hole 30 and one of the holes 33 are in alinement. The cylinder 31 rotates freely in the cylinder 34 and its upper end is rigidly connected by rod 35 to the lower member 36 of a universal joint 20 whose upper member 37 is rigidly connected to the shaft 38 of gear 21. The upper end of the shaft 38 turns in a fixed bearing 42 carried by the frame 41.

The cylinder 34 is pivoted by means of lugs 39 turning in straps 40 fastened to frame 41 so as to swing about a horizontal axis in the same horizontal plane as the universal joint 20. The cylinder 34 is held in different positions on pivots 39 by means of yoke 43 which is attached to the cylinder 34 at 44 and carries a slotted arm 45 which may be adjusted in different positions by means of the wing nut 46.

In the modification shown in Fig. 5 the shaft $25^1$ carrying the stepped gear 19 fits in the cylinder 31' and is held in different positions therein by means of the cotter pin C passing through holes O in shaft 25'.

In the modification shown in Fig. 6 the gears 19 are disassembled and one of them 19' is held against a shoulder 47 on shaft 25'' by means of collar 48, and kept from turning on said shaft 25'' in any convenient way.

The knob 50 is for resetting the passenger indicating wheels $10_1$, $10_2$, and $10_3$ to zero from outside the cover without affecting the reading of the totalizer $10^1$, $10^2$ etc. This knob 50 also operates the shutter 51 and shifts the plate 52, bearing the legends "Out" and "In" so that the appropriate legend is visible through an opening in the cover at all times. The structure and operation of these parts, together with a bell-ringing device, are old and well known in this art, so that further description of the same is deemed unnecessary for the purpose of explaining my invention.

The operation is as follows: The gear 12 is turned a predetermined amount when a fare is paid in accordance with the prevailing rate of fare. The gears 13, 15 and 16 are so proportioned that the wheel $10^1$ is turned the correct amount to indicate the fare, when the gear 12 is actuated the predetermined amount. The gears 19, 21, 22 and 23 are so proportioned that the wheel $10_1$ will be moved one step when the gear 12 is actuated an amount sufficient to cause the gear $10^1$ to turn enough to indicate the fare for one passenger. That is, the readings on the series of wheels $10^1$, $10^2$ etc. will increase seven times as rapidily as those on the series $10_1$, $10_2$ $10_3$ when the register is set for a seven cent rate of fare, as indicated by the numbers 3 and 21 on the two indicators respectively, when the third one, or seven cent gear, of the series 19 is in mesh with the gear 18, and a similar proportionate registration will take place when the other gears 19 are in mesh with gear 18.

When the rate of fare is changed to six cents, for example, the nut 46 is loosened, and the transmission mechanism S is adjusted so that the correct gear of different size in the series 19 will mesh with gear 18. The nut 46 is then tightened. This particular change would require a gear having six-sevenths as many teeth as the one for the seven cent fare. In a similar way the mechanism may be set for a five cent, eight cent or any other desirable fare, by causing a gear on shaft 25 having five-sevenths, eight-sevenths, etc. as many teeth as the seven-cent gear, to mesh with gear 18. The several gears 19 may have the fares, for which they are to be used, stamped on them or suitable legends may be placed at proper places on shaft 25, in order to avoid errors in making the adjustments.

At the end of a trip the increment in the indications on the totalizer will be the reading of the passenger indicator multiplied by the rate of fare. The conductor will turn the passenger indicator to zero by means of knob 50 and will simultaneously change the "In" or "Out" sign without altering the reading of the totalizer as is customarily done with registers of this type. The totalizer 10¹, 10², etc. and the change speed mechanism S are inside of the cover so that they are inaccessible to the conductor, who is therefore unable to cause the totalizer to indicate a smaller amount than that corresponding to the number of passengers that have been indicated on the passenger indicator.

It is to be noted that with the device as illustrated in Fig. 2, the adjustments for the different rates of fare can be made entirely by hand by merely pressing upon the end of lever 28 and sliding shaft 25 to the proper position, while setting the slotted arm 45 at the proper place by means of nut 46 so that the corresponding gear 19 will mesh with gear 18. The universal joint 20 prevents the different angular positions of the cylinder 34 from interfering with the operation as the gear 19 turns shaft 25 which carries with it the cylinder 31, which in turn drives the lower member 36 of universal joint 20. In the embodiment of the change-speed mechanism illustrated in Fig. 5 a tool may be necessary to insert and withdraw the cotter pin C. With the shaft illustrated in Fig. 6, there is little danger of applying the incorrect gear 19′ as they will be plainly marked with the respective rates of fare for which they are to be used.

It is obvious that a flexible shaft might be used instead of one with a universal joint while maintaining some of the advantages of the structure illustrated; the change speed mechanism might be introduced in the totalizer train instead of the passenger indicator train with somewhat satisfactory results; the stepped gear could be adapted to be placed at the upper instead of the lower end of the speed change mechanism; and other means than that illustrated may be used to hold the gears 19 in mesh with the gear 18. These, and other changes will be obvious to the skilled mechanic.

This invention has been developed in connection with fare registers already in the market and has been described and illustrated in connection with a well known type of register. This has been done by showing such a register adapted to the new uses by merely removing the former train of connections to the passenger indicator and attaching the change speed mechanism to the old frame. The invention would operate without the gears 18 and 24, but would require a modification of the frame used on the old registers. By the arrangement described the old registers which were suitable for only one fixed rate of fare can be quickly converted into a register that is suitable for operation at either one of a large number of different rates of fare. The gist of this invention is in so combining a passenger or unit fare indicator with a totalizer in a register that they can be caused to harmonize with each other irrespective of the rate of fare which may be in vogue at a particular time.

It is obvious that this invention may be applied to any fare register in which there is an indicator for the number of passengers and a total fare indicator, or totalizer, which are to be operated in conjunction with each other at predetermined ratios from an actuator common to both of them. The particular fare register in connection with which this invention is described in this application is one in which there is a totalizing indicator 10¹, 10², 10³, etc., for registering the total amount of fare and a passenger indicator $10_1$, $10_2$, $10_3$ for registering the number of passengers per trip. The passenger indicator $10_1$, $10_2$, $10_3$ is provided with a resetting device 50 which can be pulled outwardly and turned about its own axis to reset the indicating dials to zero in the manner well known in this art. When the knob 50 is pulled outwardly preparatory to resetting the indicator discs the upper end of the bifurcated lever 53 is pulled outwardly, thereby operating through lever 54 and link 55 to revolve arm 56, which carries shutter 51, so that the shutter 51 will close the opening in the casing (not shown) through which the numerals on the indicator discs are ordinarily visible. When the knob 50 is revolved it turns worm gear 57 which meshes with gear 58. The gear 58 is rigidly mounted upon a shaft 59 which carries a disc 60 at its other end which has a projection 61 extending into a slot 62 on lever 63 which is pivoted at 64. The lever 63 is connected by link 65 to the plate 52 which is slidably mounted by lugs 66 on rod 67 so that turning of the knob 50 to reset the indicator will shift the plate 52 to the right or left so as to leave the word "Out" or "In" visible through an opening in the cover at the appropriate time. Further detailed explanation of this portion of the register is deemed unnecessary, as it constitutes no part of this invention and this part of the operation is perfectly familiar to those skilled in this art.

I claim:

1. In a fare register, a passenger indicator and a money indicator actuated from a common source and means including a change speed mechanism that can be set for different speeds for actuating said indicators at different predetermined, relative speeds; said change speed mechanism having gear wheels of different sizes to mesh with a common gear wheel.

2. In a fare register, in combination, a passenger indicator and a money indicator actuated from a common source, and means comprising a pivoted shaft having a universal joint therein, whereby the relative amounts of actuation of said indicators may be varied.

3. In a fare register, in combination, an indicator for the number of fares; an indicator for the money collected for the fares; a driver; connections between said driver and said indicators, one of said connections comprising a shaft which has one of its ends laterally adjustable.

4. In a fare register, in combination, an indicator for the number of fares; a totalizing indicator for the money collected for the fares; a driver; connections between said driver and said indicators, one of said connections comprising change gear mechanism having a telescoping shaft.

5. In a fare register, in combination, an indicator for the number of fares; a totalizing indicator for the money collected for the fares; a driver; connections between said driver and said indicators, one of said connections comprising a longitudinally adjustable shaft, said shaft carrying gear wheels of different sizes.

6. In a fare register, in combination, an indicator for the number of fares; an indicator for the money collected for the fares; a driver; connections between said driver and said indicators, one of said connections comprising change gear mechanism having a laterally and longitudinally adjustable shaft.

7. In a fare register, in combination, an indicator for the number of fares; an indicator for the money collected for the fares; a driver; connections between said driver and said indicators, one of said connections comprising a shaft which may be manually adjusted in lateral and longitudinal directions.

8. In a fare register, in combination, an indicator for the number of fares; an indicator for the money collected for the fares; a driver; connections between said driver and said indicators, one of said connections comprising a pivoted shaft having a universal joint therein, said shaft being manually adjustable in lateral and longitudinal directions.

9. In a fare register, in combination, an indicator for the number of fares; an indicator for the money collected for the fares; a driver; connections between said driver and said indicators, one of said connections comprising a rotatable shaft, one end of which is adjustable.

10. In a fare register, in combination, an indicator for the number of fares; an indicator for the money collected for the fares; a driver; connections between said driver and said indicators, one of said connections comprising a laterally and longitudinally adjustable shaft, and means for setting and holding said shaft in its adjustable positions.

11. In a fare register, in combination, an indicator for the number of passengers; an indicator for the total fare collected; a drive shaft; connections between said drive shaft and said indicators; said connections including, a cylinder open at one end, a second open end cylinder revolubly mounted in said first cylinder, a third cylinder slidably mounted in said second cylinder, a gear, said first cylinder being pivoted, said second cylinder having a projection extending outside of said first cylinder and connected by means of a universal joint to said gear, said third cylinder carrying a number of gears of different sizes, a spring actuated catch for holding said third cylinder in different adjusted positions in said second cylinder, and means for adjusting and holding said first cylinder in different positions on its pivot.

12. In a fare register, in combination, an indicator for the number of passengers; an indicator for the total fare collected; a drive shaft carrying a gear wheel; connections between said drive shaft and said indicators; said connections including a rotatable shaft, a pivoted journal for said shaft, and means including a universal joint for connecting said rotatable shaft to said passenger indicator.

13. In a fare register, in combination, an indicator for the number of passengers; an indicator for the total fare collected; a drive shaft carrying a gear wheel; connections between said drive shaft and said indicators; said connections including a rotatable shaft, a pivoted cylinder in which said shaft rotates, and means including a universal joint for connecting said rotatable shaft to said passenger indicator.

14. In a fare register, in combination, an indicator for the number of passengers; an indicator for the total fare collected; a drive shaft carrying a gear wheel; connections between said drive shaft and said indicators; said connections including a longitudinally adjustable shaft, a pivoted journal for said shaft, and means including a universal joint for connecting said shaft to said passenger indicator.

15. In a fare register, in combination, an indicator for the number of passengers; an indicator for the total fare collected; a drive shaft carrying a gear wheel; connections between said drive shaft and said indicators, said connections including a longitudinally adjustable shaft, a pivoted journal for said shaft, and means including a universal joint for connecting said shaft to said passenger indicator, and means for adjusting the other end of said shaft laterally.

16. In a fare register, in combination, an indicator for the number of passengers; an indicator for the total fare collected; a drive shaft carrying a gear wheel; connections between said drive shaft and said indicators; said connections including a rotatable shaft adjustable in lateral and longitudinal directions, a pivoted journal for said shaft, and means including a universal joint for connecting said shaft to said passenger indicator.

17. In a fare register, in combination, an indicator for the number of passengers; an indicator for the total fare collected; a drive shaft carrying a gear wheel; connections between said drive shaft and said indicators; said connections including a shaft for carrying gear wheels of different sizes, a pivoted cylinder into which said shaft extends, means for holding said shaft in different longitudinal positions in said cylinder, and means including a universal joint for connecting said shaft to said passenger indicator.

18. In a fare register, in combination, an indicator for the number of passengers; an indicator for the total fare collected; a drive shaft carrying a gear wheel; connections between said drive shaft and said indicators; said connections including a shaft for carrying gear wheels of different sizes, a pivoted cylinder into which said shaft extends, means for holding said shaft in different longitudinal positions in said cylinder, and means including a universal joint for connecting said shaft to said passenger indicator, and means whereby said cylinder may be adjusted and held in different positions.

19. In a fare register, two revolvable indicators so connected that one registers a multiple of the other and means whereby the multiple may be varied, said means comprising a series of gear wheels of different sizes rigidly connected in close contact with each other and mounted upon a common shaft.

In testimony whereof I affix my signature.

WILLIAM M. HOFFMAN.